US 11,243,965 B2

(12) United States Patent
Peterson et al.

(10) Patent No.: US 11,243,965 B2
(45) Date of Patent: Feb. 8, 2022

(54) METHOD AND APPARATUS TO CORRELATE MOBILE DEVICE WIRELESS ACTIVITY AND SECURITY DATA

(71) Applicant: Lenovo (Singapore) Pte. Ltd., New Tech Park (SG)

(72) Inventors: Nathan J. Peterson, Oxford, NC (US); Russell Speight VanBlon, Raleigh, NC (US); John Carl Mese, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 496 days.

(21) Appl. No.: 15/945,832

(22) Filed: Apr. 5, 2018

(65) Prior Publication Data
US 2019/0311061 A1 Oct. 10, 2019

(51) Int. Cl.
*G06F 16/00* (2019.01)
*G06F 16/2458* (2019.01)
*H04W 24/08* (2009.01)
*H04W 12/12* (2021.01)
*G06F 16/29* (2019.01)

(52) U.S. Cl.
CPC ........ *G06F 16/2477* (2019.01); *H04W 12/12* (2013.01); *H04W 24/08* (2013.01); *G06F 16/29* (2019.01); *G06F 2216/03* (2013.01)

(58) Field of Classification Search
CPC .................. H04W 4/02–029; G06F 16/2645
USPC .............................. 707/776; 709/229; 726/19
See application file for complete search history.

(56) References Cited

U.S. PATENT DOCUMENTS

| | | | | |
|---|---|---|---|---|
| 9,858,739 B1* | 1/2018 | Johnson | ............ | G07C 9/00309 707/707 |
| 9,882,931 B1* | 1/2018 | Harmon | ............ | H04W 12/128 707/707 |
| 10,528,902 B2* | 1/2020 | Morgenthau | ............ | H04Q 9/00 707/707 |
| 2003/0007473 A1* | 1/2003 | Strong | ............ | G01S 13/78 370/338 |
| 2008/0051105 A1* | 2/2008 | Fomukong | ......... | H04B 7/18567 455/456.1 |
| 2010/0106852 A1* | 4/2010 | Kindig | ............ | G06F 16/437 709/231 |
| 2014/0018059 A1* | 1/2014 | Noonan | ............ | H04W 16/32 455/419 |
| 2015/0109436 A1* | 4/2015 | Chen | ............ | H04N 19/70 348/143 |
| 2015/0156031 A1* | 6/2015 | Fadell | ............ | G08B 19/005 700/276 |
| 2016/0165570 A1* | 6/2016 | Kim | ............ | G01S 5/02 455/456.2 |

(Continued)

*Primary Examiner* — Alexandria Y Bromell
(74) *Attorney, Agent, or Firm* — The Small Patent Law Group LLC; Dean D. Small

(57) ABSTRACT

A computer implemented method, apparatus, and computer program are provided. The method is under control of one or more processors configured with executable instructions. The method detects, at a wireless activity (WLA) tracking apparatus, wireless activity of a mobile device in a proximity of a local wireless environment. The method automatically generates a WLA timestamp associated with the detecting the wireless activity of the mobile device and utilizes one or more of the wireless activity and WLA timestamp to identify one or more of a security device and a segment of security data collected by the security device.

20 Claims, 6 Drawing Sheets

(56) References Cited

U.S. PATENT DOCUMENTS

2018/0070210 A1* 3/2018 Bruck .................... H04L 67/26
 707/707
2019/0279485 A1* 9/2019 VanBlon ................. G07C 9/28
 707/707

* cited by examiner

# METHOD AND APPARATUS TO CORRELATE MOBILE DEVICE WIRELESS ACTIVITY AND SECURITY DATA

FIELD

The present disclosure relates generally to detecting wireless activity of a mobile device, and more particularly to correlating the wireless activity of the mobile device with a segment of security data.

BACKGROUND OF THE INVENTION

Security systems today utilize various types of devices to collect security data, such as video and audio information, in connection with monitoring an area. For example, home and commercial security systems utilize video cameras, motion detectors, door and window sensors, glass break detectors, etc., to monitor entry to (and a presence in) a home, business, school, warehouse, office, property and the like. After activity occurs in a monitored area, the security data collected may be instrumental in identifying relevant information associated with the activity. For example, the security data may include video information can be used to identify the person(s) responsible for the activity and/or whether the activity is authorized or unauthorized.

Conventional security systems collect massive amounts of security data, such as video and audio information. However, conventional security systems offer limited mechanisms for a user to determine which segment of the security data contains the information associated with a specific activity of interest. For instance, motion sensors and video monitoring cameras are able to identify when activity occurs, but are unable to differentiate between normal/acceptable and abnormal/unacceptable activity. For example, motion cameras are unable to determine whether an individual is an authorized individual, such as a homeowner, family, customer, neighbor, friend, delivery personnel, employee and the like, or an unauthorized individuals. Typically, an operator must manually search through hours of video information from multiple video cameras to locate the segment of video information that depicts a particular activity of interest. Often, activity of interest occurs during a relatively short time period (e.g., only a few minutes) which renders manual search mechanisms even more difficult to utilize.

SUMMARY

In accordance with embodiments here, a method is provided. The method is under control of one or more processors configured with executable instructions. The method detects, at a wireless activity (WLA) tracking apparatus, wireless activity of a mobile device in a proximity of a local wireless environment. The method automatically generates a WLA timestamp associated with the detecting the wireless activity of the mobile device and utilizes one or more of the wireless activity and WLA timestamp to identify one or more of a security device and a segment of security data collected by the security device.

Optionally, the detecting may comprise detecting a wireless signature (WLS) of the mobile device. The utilizing may automatically correlate the wireless signature with the one or more of the security device and the segment of security data collected by the security device based on the WLA timestamp. The utilizing may further comprise receiving a search request designating a wireless activity factor and may search a WLA log for a WLA record of interest that satisfies the wireless activity factor. The WLA record of interest may include the wireless signature and the WLA timestamp. The utilizing may search a security data log for security data of interest based on a comparison of the WLA timestamp and security timestamps stored in the security data log. The security data of interest may include the one or more of the security device and the segment of security data collected by the security device.

Optionally, the method may display the segment of security data collected by the security device that overlaps the WLA timestamp. The method may identify a security zone in the local wireless environment in which the wireless activity occurred. The utilizing may identify the security device that may correspond to the security zone. The method may perform a security action based on the one or more of the security device and the segment of security data identified. The security action may send an electronic notification to security personnel. The security action may send a request to change a state of the security device. The security device may represent a PZT camera having pan, zoom and tilt (PZT) functionality. The security action may redirect the PZT camera to point towards a detected path of the mobile device.

In accordance with embodiments herein an apparatus is provided. The apparatus comprises a tracking circuit to detect wireless activity in proximity to a local wireless environment, a processor and a memory to store program instructions accessible by the processor. In response to execution of the program instructions, the processor automatically generates a WLA timestamp associated with the detecting of the wireless activity of the mobile device and utilizes one or more of the wireless activity and WLA timestamp to identify one or more of a security device and a segment of security data collected by the security device.

Optionally, the memory may store a WLA log including WLA records that may include wireless signatures (WLS) of mobile devices detected by the tracking circuit. The WLA records may include corresponding WLA timestamps indicating when the wireless signature of the mobile devices were detected. The WLA records may further comprise one or more of security zones where the wireless signature is detected. A WLS entry time in connection with the wireless signature may enter a detection range of the tracking circuit. A WLS exit time in connection with the wireless signature may exit the detection range. The memory may store a WLS list that may include one or more of known wireless signature, repeat wireless signature and restricted wireless signature.

Optionally, the processor, responsive to execution of program instructions, may maintain a WLA log of wireless signatures of mobile devices detected by the tracking circuit and corresponding WLA timestamps. The processor may receive a search request designating a wireless activity factor, and may search a WLA log for a WLA record of interest that satisfies the wireless activity factor, the WLA record of interest including the wireless signature and the WLA timestamp. The processor may search a security data log for security data of interest based on a comparison of the WLA timestamp and security timestamps stored in the security data log. The security data of interest may include the one or more of the security device and the segment of security data collected by the security device.

In accordance with embodiments herein, a computer program product is provided comprising a non-signal computer readable storage medium comprising computer executable code to: detect, at a wireless activity (WLA)

tracking apparatus, wireless activity of a mobile device within a proximity of a local wireless environment, automatically generating a WLA timestamp associated with the detecting of the wireless activity of the mobile device, and utilize one or more of the wireless activity and WLA timestamp to identify one or more of a security device and a segment of security data collected by the security device.

Optionally, the computer program product may further comprise a security data log. The computer executable code may search the security data log for security data of interest based on a comparison of the WLA timestamp and security timestamps stored in the security data log. The security data of interest may include the one or more of the security device and the segment of security data collected by the security device. A WLA log may include WLA records that may include wireless signatures (WLS) of mobile devices detected. The WLA records may include corresponding WLA timestamps indicating when the wireless signature of the mobile devices were detected.

DETAILED DESCRIPTION

Figure 1:
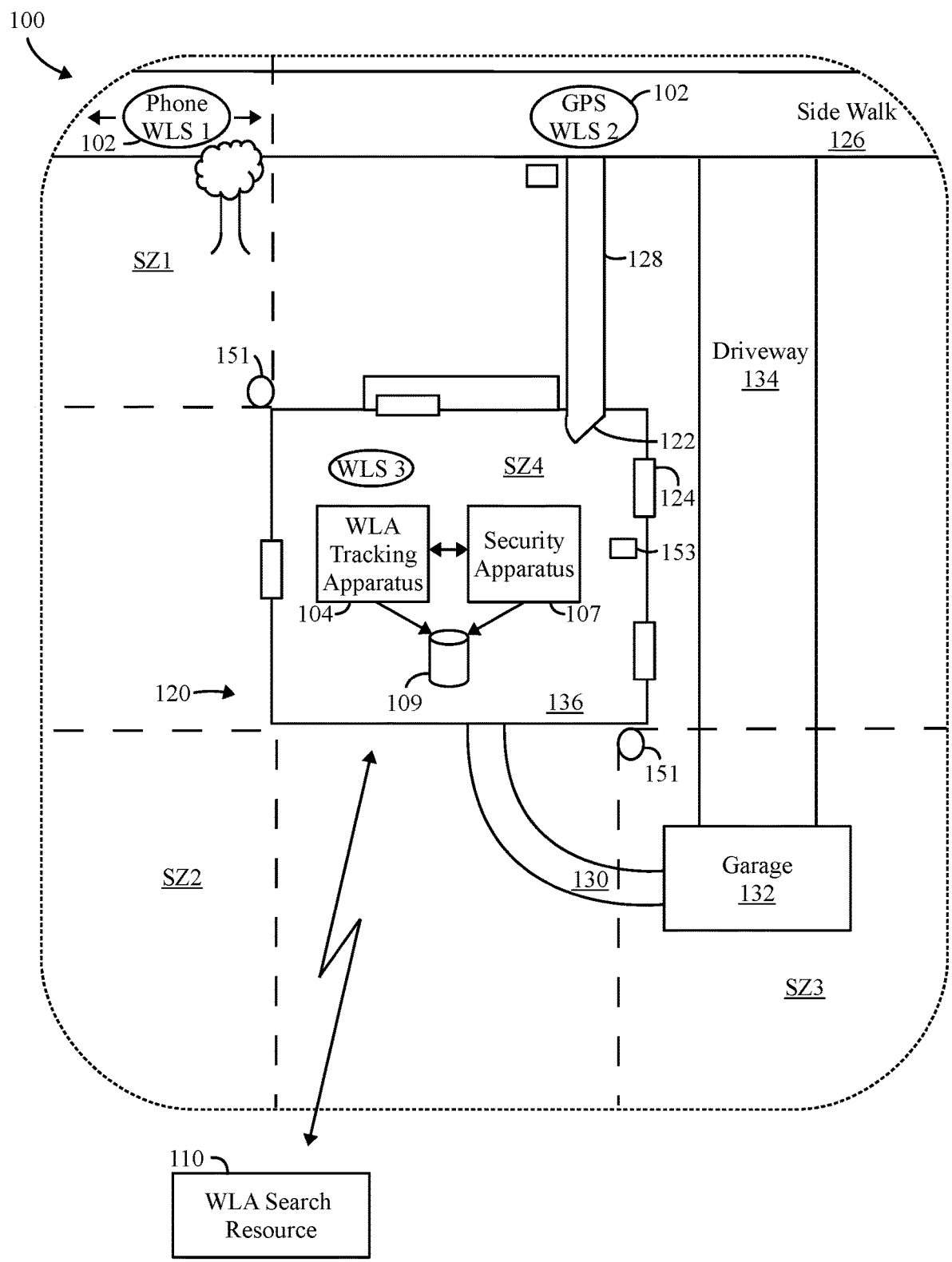
FIG. 1 is a functional block diagram illustrating a local wireless environment that is monitored in accordance with embodiments herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "wireless mobile device", as used throughout, shall include (but not be limited to) any device that is mobile and utilizes a wireless transmitter to establish at least a one-way or two-way communication session. For example, a one-way communication session may represent a data transfer session from a mobile device. The transmitter may represent a one-way transmitter, a transceiver and the like. The transceiver may be a cellular transceiver, a GPS transceiver, or any other type of transceiver capable of communication over a wireless network. As non-limiting examples, the device may be a sensor, Fitbit device, cellular phone, smart watch, wireless/cellular enable vehicles, portable computing devices and any other device that is mobile and able to establish at least a one-way communication session. The computing device can be a laptop computer, tablet computer, netbook computer, personal computer (PC), a desktop computer, a personal digital assistant (PDA), a smart phone, or any programmable electronic device capable of wireless communication.

The terms "wireless signature" and "WLS" as used herein, refer to information transmitted from a mobile wireless device that identifies the mobile device. The wireless signature may uniquely identify the mobile wireless device from other mobile wireless devices. For example, the wireless signature may represent a serial number, SSID, telephone number, MAC address, or other unique for a physical mobile wireless device, an operating system and/or software application running on the device. Additionally or alternatively, the wireless signature may not be a uniquely ID for the mobile device, but instead identify the mobile device to be within a type or class of mobile devices. For example, a GPS transmitter may transmit a wireless signature that indicates that the mobile device is a GPS transmitter (and not a cellular transmitter).

The term "broadcast signal", as used herein, refers to a signal transmitted by a transmitter of a wireless mobile device prior to, and/or independent of, establishing access to a wireless network and/or establishing a communications session. The broadcast signal may be transmitted in connection with an attempt to establish a communications session, such as by a Bluetooth, cellular or WiFi transceiver. For example, the broadcast signal may represent an advertisement or connection request transmitted over one or more broadcast channels in accordance with a cellular or other wireless protocol. Optionally, the broadcast signal may not be transmitted in connection with an attempt to establish a communications session. Instead, the broadcast signal may represent a "ping" or location indicator, such as transmitted in connection with a cellular protocol. Optionally, the broadcast signal may represent a position or time stamp, such as transmitted in connection by a GPS tracking device.

The terms "wireless activity tracking apparatus" and "WLA tracking apparatus", as used throughout, shall include routers, firewalls, cellular transceiver, GPS transceivers, wireless access point and other devices that afford access to a wireless environment and support at least one-way communication over the wireless environment. The wireless environment may represent a local area network, a private or public area network, a wide-area network, a cellular network, a GPS network or otherwise.

The terms "wireless activity" and "active wireless activity" as used throughout, refer to transmitted signals from an active transmitter of a mobile device in accordance with a wireless communications protocol. The wireless activity represents any signal transmitted by a transmitter of a mobile device, such as in connection with requesting, establishing, maintaining or disconnecting a communications session with a local or wide area network, a cellular network, a GPS network and the like. The wireless activity also represents any signal transmitted by a transmitter of a mobile device, such as in connection with a GPS or cellular device providing a "ping" to a cellular/GPS tower indicating a presence/location of the GPS or cellular device. For example, the wireless communications protocol may correspond to a local or wide area network protocol, such as a Bluetooth protocol, Bluetooth Low Energy protocol, WiFi (IEEE 802.11) protocol and the like. In addition, the wireless communications protocol may represent a cellular protocol, such as GSM, LTE, CDMA, WCDMA, TD-SCDMA and the like. In addition, the wireless communications protocol may represent a GPS protocol. In connection with GPS wireless activity, the wireless activity may correspond to coordinates, identification and location information transmitted from a GPS enabled mobile device. As non-limiting examples, the mobile device may be a sensor, Fitbit device, cellular phone, smart watch, wireless/cellular enable vehicles, portable computing devices, GPS tracking apparatus and any other device that is mobile and able to establish at least a one-way communication session. The term "wireless activity" does not include transmission of information by a passive radio-frequency identification device (RFID) wherein a passive RFID tag only transmits in response to a transmission from a separate RFID reader.

In accordance with embodiments herein, methods, apparatus and computer program products use wireless identifiers to detect wireless activity by mobile devices (and thus users carrying such mobile devices) when within a range of a reference point (e.g., the WLA tracking apparatus) and/or within designated security zones (e.g., zones proximate to security devices). WLA timestamps are generated when wireless activity occurs and the WLA timestamps are saved with the wireless activity to facilitate subsequent use of the wireless activity in connection with correlating the wireless activity to security data collected by a security apparatus.

As one example, an individual carrying a smart phone or other wireless mobile device may walk along a sidewalk or other monitored area in proximity to cameras along a boundary of a home or personal property. The security apparatus may continuously store security data over an extended period of time as collected by the cameras, without any separate identification of, or regard for, when a particular individual passes through the field of view of the cameras while walking along the sidewalk. However, when the WLA tracking apparatus detects wireless activity for the smart phone, the WLA tracking apparatus records the wireless activity (e.g., a wireless signature) along with a WLA timestamp. As explained herein, methods, apparatus and computer program products afford various mechanisms to automatically correlate the wireless signature with one or more segments of the security data and provide the security data segments for review.

FIG. 1 is a functional block diagram illustrating a local wireless environment 100 that is monitored in accordance with embodiments herein. In the example of FIG. 1, the local wireless environment 100 represents a residential or commercial establishment, such as a home, school, campus, religious establishment, warehouse, building, campus, office complex and the like that may be under control of one general entity (e.g., an owner, security company, commercial entity). The range/size of the local wireless environment 100 will vary based on the type of the wireless environment (e.g., local area network, wide area network, cellular, GPS), the range of the WLA tracking apparatus 104, structures within the local wireless environment 100 that may interfere with wireless signals and the like. In the example of FIG. 1, the local wireless environment 100 may represent a residential, school, religious or commercial premise 120 that includes a front door 122, windows 124, a rear door 136, a rear walk 130 to a neighboring structure 132 (e.g., garage or other building), and a private entryway or driveway 134. A front walkway 128 leads from a sidewalk 126 to a front porch and the front door 122. The sidewalk 126 is located next to a public road (e.g., residential street, school driveway).

The local wireless environment 100 includes a wireless activity (WLA) tracking apparatus 104, a security apparatus 107 and a WLA-based search resource 110. As explained herein, the WLA tracking apparatus 104 and the security apparatus 107 manage collection and storage of wireless activity and security data, in one or more common or separate database 109. The WLA and security data may be managed in connection with predetermined security zones (denoted as SZ1, SZ2, SZ3, and SZ4) or otherwise. For example, security zones (SZ1, SZ2, SZ3, and SZ4) may be defined as the area visible by respective security cameras 151. It is recognized that numerous other predetermined security zones may be defined.

The WLA tracking apparatus 104 may represent a network gateway to a local or wide area network, cellular hotspot, cellular tower, GPS transponder and/or any other electronic device that includes at least a receiver programmed by software and/or firmware to receive and/or support bidirectional communication with one or more predetermined communications protocols. The wireless mobile devices 102 move into and out of the range of the WLA tracking apparatus 104 following paths taken by individuals through the local wireless environment 100. The WLA tracking apparatus 104 is configured to detect mobile devices 102 that enter within a detection range of the WLA tracking apparatus 104 and/or are within proximity to one or more security devices 151, 153. The WLA tracking apparatus 104 automatically generates WLA timestamps associated with the detection of the wireless activity and records the WLA timestamps with the wireless activity. For example, a log may be maintained of dates/times and wireless signatures (WLS) for mobile devices 102, along with other information indicative of a nature of the wireless activity and/or movement of the mobile devices 102. For example, the WLA tracking apparatus 104 may record a WLS entry time stamp representing a WLA timestamp (e.g., date and time) when the wireless signature of a first mobile device 102 was first detected. The WLA tracking apparatus 104 may also record a WLS exit timestamp representing a WLA timestamp indicative of when the wireless signature of the first mobile device 102 was last detected before leaving the detection range of the WLA tracking apparatus 104 (within a predetermined search window of time). Additionally or alternatively, the WLA tracking apparatus 104 may record one or more intermediate WLA timestamps corresponding to dates and times at which the first mobile device 102 performed actions of interest. As an example, when tracking a path of the mobile device 102, WLA timestamps may be generated and recorded each time the mobile device 102 crosses into or leaves different security zones. Also, WLA timestamps may be generated and recorded each time the mobile device 102 changes a direction or enters/exits predetermined range boundaries from a reference point (e.g., relative to the WLA tracking apparatus 104).

Optionally, the WLA tracking apparatus 104 may include multiple physical devices that are located at separate physical positions (and distributed from one another) within the local wireless environment 100. When multiple physical devices are utilized to collectively form the WLA tracking apparatus 104, the separate physical devices may operate in cooperation with or independent of one another, in a master-slave relation, a client-server relation and the like. Optionally, the multiple physical devices may communicate with a remote/cloud based server (e.g., WLA search resource 110) that performs some or all of the operations described herein. Additionally or alternatively, a remote/cloud based server, WLA search resource 110, may store information and data utilized in connection with, and/or generated in response to, the operations described herein. Optionally, one or more repeater devices may be utilized with the WLA tracking apparatus 104 to extend a range of the local wireless environment 100.

As an example, the WLA tracking apparatus 104 may represent a router that creates a wireless local area network (WLAN) in accordance with the Institute of Electrical and Electronics Engineers (IEEE) 802.11 protocol. The mobile devices 102 connect to the WLAN in accordance to an IEEE 802.11 compatible security algorithm, such as, for example, Wi-Fi Protected Access (WPA), Wi-Fi Protected Access II (WPA2), or Wired Equivalent Privacy (WEP). The WLA tracking apparatus 104 can provide access to network for wireless devices connected to the wireless router, such as mobile devices 102, directly via bridging functionality integral to the WLA tracking apparatus 104, or in conjunction with bridging functionality, not shown, that is accessible by the WLA tracking apparatus 104. The network can be, for example, a cellular network, a local area network (LAN), a wide area network (WAN) such as the Internet, or a combination of the two, and can include wired, wireless, or fiber optic connections. While the WLA tracking apparatus 104 may provide access to a network, the WLA tracking apparatus 104 performs the wireless activity detecting and/or tracking operations described herein while denying the mobile devices 102 access to the LAN, WAN, cellular network and the like. The WLA tracking apparatus 104 performs the wireless activity detecting and/or tracking operations described herein without regard for establishing a communications session with the mobile devices 102. Additionally or alternatively, the WLA tracking apparatus 104 may perform the wireless activity detecting and/or tracking operations described herein during a one-way or two-way communication session with the mobile devices 102.

The security apparatus 107 is also provided for the local wireless environment 100. The security apparatus 107 includes various security devices that collect security data. For simplicity, only cameras 151 and motion sensors 153 are illustrated as security devices, although it is recognized that additional or alternative security devices may be included such as one or more door/window sensors, motion sensors, glass break sessions, door/window locks, thermostat controls, light controls and the like. The security data is stored in a security data log along with security timestamps indicative of when the security data was collected. For example, the security data may include numerous segments of video, still images and/or audio security data collected by various cameras and/or microphones. As another example, the security data may include numerous segments related to events detected by sensors, such as door/window sensors, motion sensors, glass break sensors, door/window locks, thermostat controls, light controls and the like. It is recognized that security data segments related to events detected by the non-video sensors may not include large amounts of continuous security data, such as in video security data, although a large number of security data segments may be stored in connection with sensor detected events (e.g., every time a door is opened and closed, motion is detected in a room, lights are turned on and off, etc.). The security apparatus 107 may record a security timestamp in connection corresponding each security data segments. Additionally or alternatively, the security apparatus 107 may record security timestamps periodically during a continuous collection of security data, such as when security criteria occur.

Embodiments herein monitor wireless activity in connection with various types of mobile devices 102 while located at various positions about the premise 120. For example, an individual with a cellular phone (denoted as WLS1) may be walking along the sidewalk 126, while another individual on the sidewalk 126 may be carrying a mobile device with GPS functionality (WLS2). Additionally or alternatively, an individual, with a Fitbit device (WLS3), may be within the premise 120.

In the embodiment described in connection with FIG. 1, the security apparatus 107 manages and communicates with the security cameras 151, sensors 153 and other security devices. To the extent that the WLA tracking apparatus 104 desires to communicate with the security devices, the WLA tracking apparatus 104 conveys the communication to the security apparatus 107 for further action. For example, when the WLA tracking apparatus 104 desires to change a viewing angle of a security camera 151, the WLA tracking apparatus 104 may convey a request to change a state of the security device (e.g., pan, zoom, tilt the viewing angle) to the security apparatus 107. As another example, when the WLA tracking apparatus 104 desires to change a state of a sensor-based security device (e.g., turn on/off a motion sensor, a door/window sensor, a door/window lock), the WLA tracking apparatus 104 conveys the request to change the sensor setting to the security apparatus 107. The security apparatus 107 acts upon the corresponding request.

Additionally or alternatively, the WLA tracking apparatus 104 may communicate over a local area network with security cameras 151 and/or sensors 153 (e.g., motion sensors, glass break detectors, etc.) that monitor the local wireless environment 100. The security cameras 151 record video data for corresponding fields of view. The cameras 151 may be activated by motion and/or by other sensors 153. Alternatively, the security cameras 151 may be activated continuously to record of video information.

The WLA search resource 110 is configured to utilize the wireless activity and/or the WLA timestamp to identify security devices of interest and/or segments of interest from the security data. The WLA search resource 110 is further configured to perform security actions based on the identification of a security device of interest and/or segment of interest from the security data. The operations of the WLA search resource 110 may be implemented in various manners, depending in part upon an overall configuration of the system. For example, the WLA search resource 110 may be implemented as an application operating within the WLA tracking apparatus 104 and/or within the security apparatus 107. Additionally or alternatively, the WLA search resource 110 may be implemented as an application operating on a mobile device, desktop computer and/or a workstation.

Additionally or alternatively, the WLA search resource 110 may be implemented on a remote server. For example, when implemented on a remote server, the WLA search resource 110 may receive search queries from the WLA tracking apparatus 104, security apparatus 107 and/or a mobile device of an authorized user. The search queries may be entered through a graphical user interface (GUI) presented to the authorized user on the WLA tracking apparatus 104, security apparatus 107 and/or a mobile device. Additionally or alternatively, the search queries may be automatically generated by the WLA tracking apparatus 104 and/or security apparatus 107. In response to a search query, the WLA search resource 110 implements the operations described herein to identify a security device of interest, a segment of interest of security data, a wireless signature, an individual associated with a particular mobile device and the like, to form a search response. The WLA search resource 110 returns the search response to the requesting device or apparatus which in turn presents the search response on the graphical user interface of the WLA tracking apparatus 104, security apparatus 107 and/or a mobile device.

Figure 2:
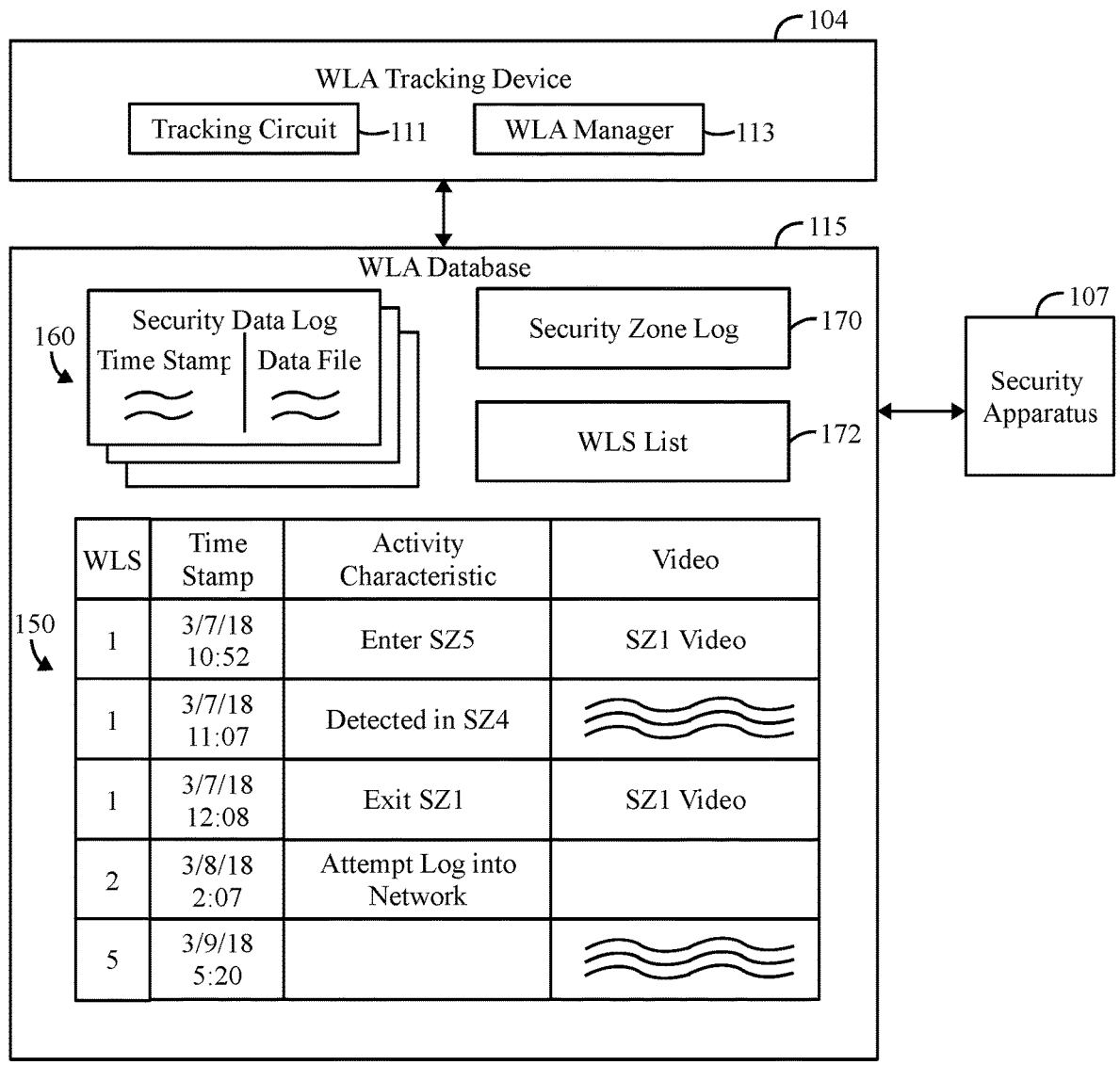
FIG. 2 illustrates a block diagram of a WLA tracking apparatus and WLA database formed in accordance with embodiments herein.

FIG. 2 illustrates a block diagram of a WLA tracking apparatus 104 and WLA database 115 formed in accordance with embodiments herein. The WLA tracking apparatus 104 includes a tracking circuit 111 and a WLA manager 113, defined by one or more processors executing program instructions, that perform operations described herein. The tracking circuit 111 is configured to detect wireless activity within a detection range of the tracking circuit in proximity to the local wireless environment 100. For example, the tracking circuit 111 may be connected to an antenna that is located within or mounted on a housing of the WLA tracking apparatus 104. The local wireless environment 100 may be defined by a range boundary of the detection range of the antenna and tracking circuit 111. Additionally or alternatively, multiple antenna may be attached to the WLA tracking apparatus 104, thereby expanding the range boundary of the detection range of the tracking circuit 111 and local wireless environment. The multiple antennas may be physically located within a common housing of the WLA tracking apparatus 104, or distributed at multiple points within the premise 120. For example, one antenna may be provided at the WLA tracking apparatus 104, while one or more additional antenna may be provided within repeaters and the like.

The tracking circuit 111 detects a presence of one or more mobile devices 102, within a range of the WLA tracking apparatus 104, based on one or more characteristics of a broadcast signal from each of the corresponding mobile devices 102. Additionally or alternatively, the tracking circuit 111 may detect a path traveled by the mobile device 102 and track the detected path of the mobile device 102 based on one or more characteristics of the broadcast signal from the mobile device 102. For example, the tracking circuit 111 may monitor, as the characteristic of interest, a signal strength of broadcast signals from a mobile device 102 (as received at the tracking circuit 111). For example, the tracking circuit 111 may determine a distance to the mobile device 102 based on a receive signal strength and reference receive signal strengths. For example, during a learning mode, the tracking circuit 111 may perform a calibration operation in which the tracking circuit 111 collects multiple reference receive signal strengths in connection with predetermined distances and/or directions. The tracking circuit 111 associates the reference receives signal strengths with the predetermined distances and directions relative to a reference point for the WLA tracking apparatus 104. The signal strength measurements and predetermined distances and/or directions are then used later, by the tracking circuit 111 and/or WLA manager 113, in connection with tracking wireless activity of other mobile devices 102. The reference receive signal strengths, predetermined distances and directions may be collected independent of, the security apparatus 107 and security devices 151, 153.

Additionally or alternatively, the reference receives signal strengths, predetermined distances and directions may be collected in connection with corresponding unique security devices 151, 153. For example, during a calibration operation, reference receive signal strength measurements may be collected while the user holds a mobile device 102 (operating in a calibration mode) proximate to a security device 151, 153. For example, the GUI of the mobile device 102 may direct the user to walk to a point proximate to a security device 151, 153, at which the tracking circuit 111 records a signal strength and other direction related information from signals transmitted by the mobile device 102. As another example, the user may be directed to perform a requested suspect movement, to beginning at a location on a public sidewalk or outside of a property boundary, jumping a fence or entering the property from some location other than a walkway, and/or moving along an exterior of a building adjacent to one or more windows or private entrances. As the user performs the requested suspect movement, the tracking circuit 111 collects multiple calibration receive signal strength measurements.

Additionally or alternatively, the security devices 151, 153 may include transmitters and have wireless communication functionality. When wireless security devices 151, 153 are present, the WLA tracking apparatus 104 may perform a registration operation to register each of the security devices 151, 153 with the WLA tracking apparatus 104. To register a security device 151, 153 with the WLA tracking apparatus 104, the tacking circuit 111 may record a wireless signature for the security device 151, 153 and a signal strength of a signal broadcast from the security device 151, 153. It is recognized that other techniques may be utilized to calibrate the WLA tracking apparatus 104. Optionally, the tracking circuit 111 may track positions of mobile devices 102 based on signal characteristics other than signal strength. Optionally, no calibration may be needed when the WLA tracking apparatus 104 merely registers entry and exit of mobile devices 102 within a range boundary of the tracking circuit 111, and do not further track individual paths followed by mobile devices 102.

The WLA database 115 includes one or more of a WLA log 150, a security data log 160, and a security zone log 170. Optionally, the WLA log 150, security data log 160 and security zone 170 may be maintained in different physical memories. Optionally, the WLA database 115 may maintain a WLS list 172 that includes various types of wireless signature. For example, the WLS list 172 may include a list of known authorized wireless signature, such as wireless signature related to mobile devices owned or controlled by homeowners, family members, friends, employers, employees, school administrators, teachers, students and the like. The WLS list 172 may also include a list of unknown repeat wireless signature, such as wireless signature related to mobile devices that have been detected by the WLA tracking apparatus 104 a predetermined number of times.

The WLA manager 113 records wireless activity in the WLA log 150 as the wireless activity is detected by the tracking circuit 111. The WLA manager 113 may record the wireless activity in various manners in the WLA log 150. For example, the WLA manager 113 may simply store, in a spool format, all wireless signature identified by the tracking circuit 111, along with a timestamp for when the tracking circuit 111 detected the wireless signature. In the foregoing example, a single wireless signature may be recorded multiple times in the WLA log 150 along with multiple corresponding timestamps, thereby providing a running log of the amount of time in which the corresponding mobile device 102 is present within the range of the WLA tracking apparatus 104. Optionally, the WLA manager 113 may manage the WLA log 150 in a more selective manner, based on various criteria. For example, the WLA manager 113 may only add a wireless signature and corresponding timestamp to the WLA log 150 when a new mobile device is detected to enter or exist a predetermined detection range boundary of the WLA tracking apparatus 104. Additionally or alternatively, the WLA manager 113 may update a record in the WLA log 150, or add a new record to the WLA log 150, when a wireless signature is determined by the tracking circuit 111 to move from one security zone to another.

The WLA log 150 stores a unique identifier for each mobile device 102, for which wireless activity is detected, along with one or more WLA timestamps and (optionally) activity characteristics associated with the wireless activity. The unique identifier may represent the wireless signature broadcasts by the mobile device 102. Additionally or alternatively, the tracking circuit 111 may assign a random identifier in connection with each mobile device 102 for which wireless activity is detected. The WLA manager 113 may also store an activity characterization describing the character of the wireless activity. For example, the activity characterization may indicate the presence of the wireless device 102 relative to one or more of the security zones (SZ1, SZ2, SZ3, and SZ4). In the example of FIG. 2, the activity characterization may indicate that a wireless signature has entered a security zone "Enter SZ1", was simply detected present within a security zone "Detected in SZ4", has exited a security zone "Exist SZ1", and the like. Additionally or alternatively, the activity characteristics may indicate other actions taken by the mobile device relative to the network, such as "attempt to log into network", "attempt to pair with Bluetooth device", etc.

Additionally or alternatively, the WLA manager 113 may not add all wireless signature to the WLA log 150 once detected. The sensitivity range of the WLA tracking apparatus 104 may be greater than a field of view of security cameras. Accordingly, addition to the WLA log 150 may be based at least in part on whether a mobile device 102 is within a desired proximity of a security zone and/or security device. For example, the WLA manager 113 may be configured to store the wireless signature on the WLA log 150 and generates a corresponding WLA timestamp only the mobile device 102 is in proximity to one or more of the security devices 151, 153.

Optionally, the WLA timestamps may be stored on a remote log, such as at a remote security monitoring system or WLA search resource. The WLA log 150 and/or a remote log may maintain all or some WLA timestamps generated by the detection of any wireless signature that are analyzed in accordance with the operations of FIGS. 3 and 4 to allow the system to learn more about wireless activity within the area and in connection with individual wireless signature.

Additionally or alternatively, the WLS manager 113 may automatically implement certain preprogrammed security actions directly or in coordination with the security apparatus 107. For example, any time an unknown wireless signature is detected to be within certain security zones, the WLS manager 113 may send an electronic notification to an owner, manager or other designated individual indicating the presence of the unknown wireless signature in the security zone. As another example, the WLS manager 113 may compare newly detected wireless signature to a list of restricted wireless signature known to be associated with i) individuals who are not authorized to approach a local wireless environment 100 (e.g., individuals having a history of presenting danger to a family member, children and the like), or ii) individuals who are of interest (e.g., individuals registered to own assault rifles). When a restricted wireless signature associated with such individuals is detected to be present within the local environment, the WLA tracking apparatus 104 may automatically implement a preprogrammed security action. For example, the preprogrammed security action may be to send an electronic notification (e.g., email, text, voicemail) to a security personnel, such as administrators for and/or employees at the facility (e.g., superintendents, teachers), local law enforcement authorities, and the like. As another example, when the local environment is a residential home, the preprogrammed security action may be to send the electronic notification to the resident, neighbors and the like.

The WLA log 150 may define access settings to be implemented in connection with different wireless signature. The WLA tracking apparatus 104 stores and manages one or more security zone logs 170 and one or more WLA logs 150. The security zone logs 170 and WLA log 150 may be stored in WLA database 115 locally and/or remotely from the WLA tracking apparatus 104.

The security zone log 170 is utilized to define one or more monitored security zones (SZ1, SZ2, SZ3, and SZ4) in connection with the local wireless environment 100. A security zone may correspond to a single predetermined security device and/or multiple security devices. Additionally or alternatively, a monitored zone may correspond to a physical region, without regard for any predetermined security devices. Non-limiting examples of monitored regions represent predetermined security zones (SZ1, SZ2, SZ3, and SZ4).

Optionally, the security zone log 170 may also store security zones that are monitored by independent security devices that are managed or controlled by a third-party. For example, a WLA tracking apparatus 104 may be provided in a residential or commercial site that is located adjacent to independent residential or commercial sites that have independent security apparatus. The WLA tracking apparatus 104 may not be directly coupled, or have any access rights, to such independent security apparatus. Nonetheless, the WLA tracking apparatus 104 may be calibrated or programmed concerning a of the presence and/or locations of security devices within the independent security apparatus.

The WLA manager 113 may enter a learning mode to initially populate and periodically update the security zone log 170. Optionally, the WLA manager 113 may update the security zone log 170 throughout operation, without a need to enter any particular mode in connection there with.

The WLA log 150 retains WLA records in connection with multiple individual wireless signatures. As non-limiting examples, a WLA record may maintain a WLA timestamp and wireless signature associated with detection of individual wireless signature, as well as an activity history. The activity history may be maintained in various manners. For example, the activity history may maintain a record of timestamp (e.g., time and date) that a wireless signature was detected, along with an indication of which security zone the wireless signature was detected within. For example, the activity history may record a list of security zones entered by a mobile device associated with a particular wireless signature, along with the timestamp of such entries.

The WLA database 115 may also include a security data log 160. Optionally, the security data log 160 may be maintained in memory independent and separate from the WLA database 115. The security apparatus 107 manages the security data log 160, as well as the security devices 151, 153. For example, the security apparatus 107 may turn data collection on and off for the security devices 151, 153 periodically and/or based on various criteria. For example, video cameras may be turned on continuously and/or during certain times of day. Optionally, video cameras may be turned on in response to motion, where the motion sensitivity is turned on and off based on different criteria. The security apparatus 107 may manage pan zoom and tilt (PZT) for security cameras having the corresponding PZT functionality.

The security apparatus 107 records the security data as security files for the corresponding security devices 151, 153. The security apparatus 107 also records security timestamps in connection with the security data collected by the security devices 151, 153. The security data and timestamps are stored in the security data log 160. The security apparatus 107 may manage incoming security data from a corresponding security device 151, 153 in various manners. For example, the security apparatus 107 may maintain one continuous security data log for each corresponding security device 151, 153, with timestamps added to the continuous security data log periodically or in response to select security related actions. Optionally, the security apparatus 107 may periodically begin a new file in connection with each security device 151, 153. Optionally, the security apparatus 107 may maintain separate security data files in response to select security related actions, such as the detection of motion, sound, and/or opening/closing of doors/windows.

The security apparatus 107 may operate entirely independent of, and asynchronously with, the WLA tracking apparatus 104. For example, the security apparatus 107 may generate security timestamps that are stored with the security data based on security criteria (e.g., periodically or in response to security related actions). Separately and asynchronously, the WLA tracking apparatus 104 may generate WLA timestamps that are stored in the WLA records based on WLA criteria. An example of WLA criteria is when the WLA tracking apparatus 104 detects a mobile device 102 entering or exiting a security zone, entering or exiting a range boundary of the WLA tracking apparatus 104 and the like.

Optionally, the security apparatus 107 may communicate with the WLA tracking apparatus 104 throughout operation. As a further option, the security apparatus 107 may coordinate data storage with the WLA tracking apparatus 104. For example, the security apparatus 107 may store security data (e.g., video segments) within, linked to or associated with the WLS records stored in the WLA log.

Optionally, the security apparatus 107 and WLA tracking apparatus 104 may be integrated into a common apparatus or system. For example, the security apparatus 107 and WLA tracking apparatus 104 may be physically housed in a common device and implemented as applications on common or different processors. As another example, a preexisting security apparatus 107 may include memory and one or more processors where the processors execute specific program instructions to implement an upgrade to add the functionality of the WLA tracking apparatus 104. As yet another example, a preexisting WLA tracking apparatus 104 may be implemented with a network router, where the network router includes memory and one or more processors that execute specific program instructions to implement an upgrade to add the functionality of the security apparatus 107.

Optionally, the WLS list 172 may also include a list of restricted wireless signature that are not permitted within the local wireless environment 100. For example, in connection with a residential premise, when a resident has a restraining order against a third party, the third-party may be required to record the wireless signature of any mobile devices owned or controlled by the third-party. The wireless signature for the third-party mobile devices may be added to the restricted WLS list, and when detected to be present within the local environment, the WLA tracking apparatus 104 may automatically implement a preprogrammed security action. For example, the preprogrammed security action may be to send an electronic notification (e.g., email, text, voicemail) to local law enforcement authorities, to the resident of the premise and the like.

As another example, a local wireless environment 100 may correspond to a public or government facility frequented by children and other young individuals (e.g., elementary school, middle school, high school, academic campus, church, day care center, playground, sports facility and the like). For example, certain types of individuals (e.g., felons, predators, individuals convicted of child-related offenses, individuals charged or convicted of sex crimes, individuals charged or convicted of drug-related offenses) may be required to register certain information with one or more private or public agencies or authorities. As another example, individuals who have purchased, or are in possession of, any or certain types of firearms (e.g., assault rifles) may be required to register certain information with one or more private or public agencies or authorities. In connection with the registration, the individuals may be required to provide wireless signatures for any wireless mobile devices owned, carried or controlled by the individual. The wireless signature for the foregoing types of individuals may be added to the restricted WLS list. When a restricted wireless signature is detected to be present within the local wireless environment 100, the WLA tracking apparatus 104 and/or security apparatus 107 may automatically implement a preprogrammed security action. For example the preprogrammed security action may be to send an electronic notification (e.g., email, text, voicemail) to administrators for and/or employees at the facility (e.g., superintendents, teachers), local law enforcement authorities, and the like. The electronic notification may indicate the individual on record associated with the wireless signature, the time and nature of the wireless activity, an area in which the wireless activity was detected and the like.

As another example of preprogrammed security actions, the WLA tracking apparatus 104 may initiate door/window locks to close a facility before an individual enters the facility. As yet another example, the WLA tracking apparatus 104 may instruct security cameras 151 to continuously record for an area in which the wireless signature was detected. When security cameras 151 include pan, zoom and tilt functionality, the WLA tracking apparatus 104 may direct the security camera 151 (directly or through the security apparatus 107) to point to, focus on and follow the mobile device having the restricted wireless signature.

In the foregoing examples, the restricted WLS list is generated based on individuals registering with agencies, such as a parole office, a local law enforcement authority, a state law enforcement authority, a federal law enforcement authority. Additionally or alternatively, the individuals may register with private agencies. For example, when an individual purchases a firearm, the individual may include, within the registration information, identifying information for any mobile devices owned, carried or controlled by the individual that would enable a wireless signature for each mobile device to be identified and added to the restricted WLS list.

In the foregoing examples, the restricted WLS list is populated based on information entered by the individual who owns, controls or carries a particular mobile device. Additionally or alternatively, the wireless signature for mobile devices of the foregoing individuals may be separately obtained without the knowledge of or approval by the individuals. For example, the WLS information may be obtained from manufacturers of the mobile devices, cellular providers, government agencies and any other public or private entity with knowledge of the mobile devices associated with the individual. For example, mobile device records of all individuals in a select geographic region (e.g., state, county, city) with Felony convictions or registered to own assault rifles may be reviewed to obtain wireless signature and the wireless signature are added to the restricted WLS list in all WLA tracking apparatus for the corresponding region.

Figure 3:
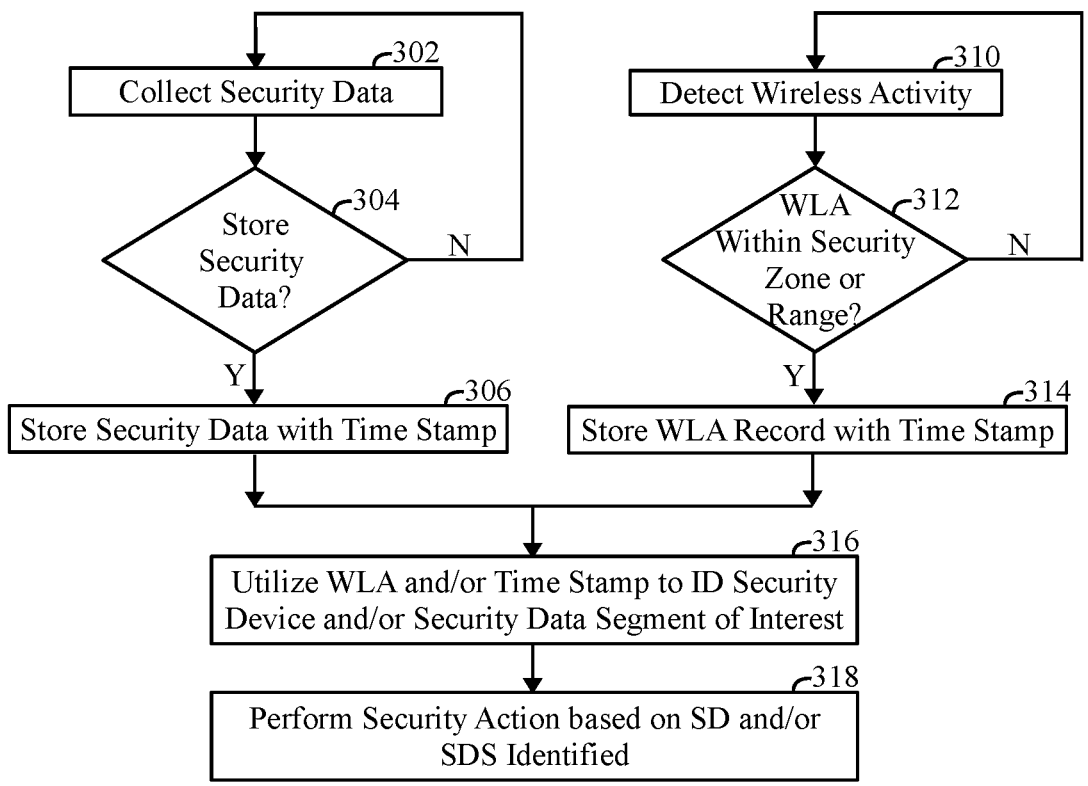
FIG. 3 illustrates a process for collecting wireless activity and security data in accordance with embodiments herein.

FIG. 3 illustrates a process for collecting wireless activity and security data in accordance with embodiments herein. FIG. 3 illustrates parallel processes that may be performed in coordination with one another, or independently and asynchronously, from one another by security apparatus and WLA tracking apparatus. The processes enter an active or armed mode in various manners. For example, the security related process may be initiated by a user input, such as when a user (locally or remotely) arms the premise security apparatus 107. As another example, the WLA and/or security related processes may be automatically initiated, such as based on preprogrammed times, when the WLA tracking apparatus 104 determines that a mobile device having an authorized user wireless signature (e.g., the homeowner) has left the range of the WLA tracking apparatus 104 and/or based on other criteria.

At 302, one or more of the security devices 151, 153 collect security data. The security cameras 151 may record continuously in connection with continuous video surveillance for corresponding fields of view. Alternatively, the security cameras 151 may be activated by motion detectors 153 and/or other sensors and record video data for corresponding time periods. Optionally, the security cameras 151 may be programmed to be activated during predetermined times (e.g., nighttime). The motion sensors 153 and other security devices also record security data, such as when security related actions occur (e.g., motion is detected, doors/windows open/close and the like).

At 304, one or more processors of the security apparatus 107 determine whether the security data should be stored. For example, all incoming security data may be stored, or alternatively select portions of the security data may be stored, such as in connection with certain security related actions (e.g., motion detection, opening/closing of doors, and the like). When the security data is not to be stored, flow returns to 302 where additional security data is collected.

Alternatively, when the security data is to be stored, flow moves from 304 to 306. At 306, the one or more processors of the security apparatus 107 store the security data in the security data log 160. In addition, the processors generate a security timestamp corresponding to when the security data was collected and store the security timestamp in the security data log 160 in connection with the security data. By way of example, a security timestamp may be recorded daily, hourly or on some other periodic basis. As another example, security timestamps may be recorded each time security related actions occur, such as motion is detected, windows/doors are opened/closed and the like.

Separately or in parallel, at 310, the tracking circuit 111 of the WLA tracking apparatus 104 detects wireless activity within a detection range of the tracking circuit 111. The detection of wireless activity may occur before and without regard for whether a communications link is established with any mobile device(s) 102 within the wireless range of the WLA tracking apparatus 104. For example, WLA tracking may be performed in connection with a local area network (LAN) while a router of the LAN denies the wireless devices 102 access to the LAN. Additionally or alternatively, the tracking circuit 111 may detect the wireless activity while a communications link is established between a mobile device 102 and a router within the LAN. Additionally or alternatively, after the communications link has terminated, the tracking circuit 111 may continue detecting wireless activity of a corresponding mobile device 102 and/or may begin detecting wireless activity of the mobile device 102.

The wireless activity includes a wireless signature of one or more mobile wireless devices. The processors detect wireless activity by, among other things, searching for one or more wireless signature of mobile wireless devices within a range of the WLA tracking apparatus(s) 104. For example, the tracking circuit 111 may receive information from the mobile device that identifies the mobile device, such as a serial number, SSID, telephone number, MAC address, and the like.

At 312, the one or more processors determine whether the wireless activity is within a security zone. For example, the determination at 312 may determine whether the wireless activity is within a security zone stored in the security zone log 170 (e.g., one or more security zones SZ1, SZ2, SZ3, and/or SZ4 associated with the security devices 151, 153). The wireless activity may be determined based on one or more characteristics of a broadcast signal from the mobile device 102. The wireless activity may be determined and/or tracked in various manners. For example, the tracking circuit 111 may determine a position of a mobile device 102 through triangulation, range detection, signal strength, signal directionality and the like. When the wireless activity is not within a security zone, flow returns to 310. Alternatively, when the wireless activity is within a security zone, flow advances to 314.

At 314, the one or more processors of the WLA tracking apparatus 104 store the WLA activity in the WLA log 150. At 314, the processors also generate a WLA timestamp corresponding to the time at which the WLA activity was detected and store the WLA timestamp in the WLA log 150 in connection with a wireless signature. Optionally, the processors may store a location associated with the wireless signature. For example, the location may be recorded as a physical coordinate or GPS location designator. Additionally or alternatively, the location may be recorded as a range measurement, signal strength measurement, directionality measurement and the like.

Optionally, the determination at 312 may be based in whole or in part on whether the wireless activity includes a wireless signature corresponding to a known wireless signature. For example, the WLA manager 113 may identify a wireless signature from the wireless activity and compare the detected wireless signature to a list of authorized wireless signature (for known mobile devices). When the detected wireless signature is on the list of authorized wireless signature for known mobile devices, the WLA manager 113 may choose to not store the wireless activity at 314. Optionally, the determination at 312 may be omitted entirely and all wireless activity detected at 310 may be stored in the WLA log at 314, along with the corresponding WLA timestamp.

The operations at 302-314 may be repeated by the security apparatus and WLA tracking apparatus continuously and/or in response to corresponding criteria, thereby building separate or common a WLA log 150 and security data log 160 that may be utilized as described hereafter. It is recognized that multiple security apparatus may be operating in combination or independently of one another to build corresponding security data logs 160. Similarly, multiple WLA tracking apparatus may be operating in combination or independently of one another to build corresponding WLA logs 150.

At 316, the process utilizes the wireless activity and/or the WLA timestamp to identify a security device of interest and/or a segment of interest from the security data. At 318, the process performs a security action based on the security device of interest and/or segment of interest from the security data identified in 316. The operations at 316 and 318 may be implemented in various manners by the WLA tracking apparatus 104, the security apparatus 107 and/or the WLA search resource 110, depending in part upon an overall configuration of the system. Various embodiments for the operations at 316 and 318 are described herein.

While the foregoing example is provided in connection with one mobile device, it is recognized that the process of FIG. 3 may be implemented in connection with multiple mobile devices. For example, the detecting operation detects wireless activity of multiple mobile devices and the storing operation stores separate WLA timestamps of multiple mobile devices.

Figure 4A:
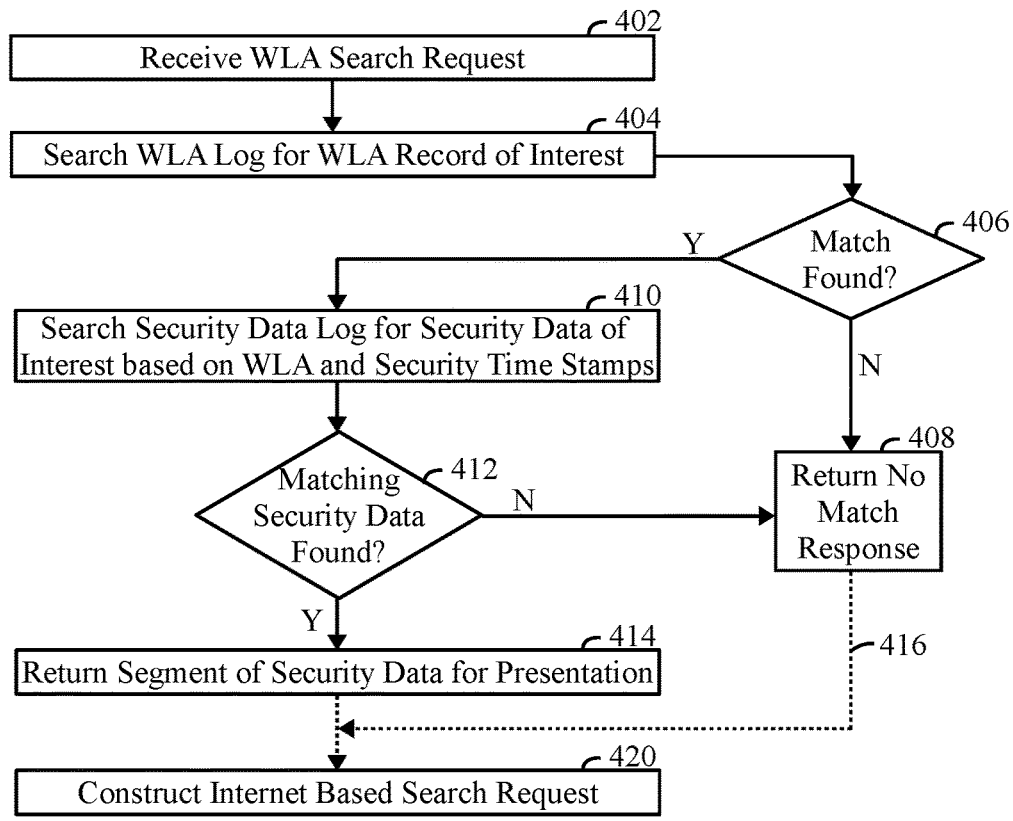
FIG. 4A illustrates a process for utilizing wireless activity and/or WLA timestamps to identify a security device of interest and/or a segment of interest from the security data in accordance with embodiments herein.

FIG. 4A illustrates a process for utilizing wireless activity and/or WLA timestamps to identify a security device of interest and/or a segment of interest from the security data in accordance with an embodiment herein. The operations of FIG. 4A may be implemented by the WLA tracking apparatus 104, the security apparatus 107, and/or the WLA search resource 110. At 402, the one or more processors receive a WLA search request. The WLA search request may include various search criteria. For example, the search criteria may designate wireless activity factors, such as a search for any wireless activity within a predetermined time frame, a search for any wireless activity within certain security zones, a search for any wireless activity by unknown wireless signature, a search for any wireless activity related to unknown and/repeat wireless signature, a search for any wireless activity by restricted wireless signature and the like.

At 404, the one or more processors search the WLA log for a WLA record of interest that satisfies the WLA search criteria. At 406, the one or more processors determine whether a WLA record of interest was found that satisfies the WLA search criteria. When no match is found, flow continues to 408. At 408, a response is returned indicating that no match was found. Alternatively, at 406, when a WLA record of interest is found, flow moves to 410. At 410, the one or more processors identify the WLA timestamp from the WLA record of interest. At 410, the processors search the security data log for security data of interest. The search for the security data of interest may be based on the WLA timestamp and one or more security timestamps stored with the security data. For example, when a WLA timestamp indicates a particular point in time, the processors may identify the segment of the security data that begins at or at least encompasses the point in time associated with the WLA timestamp. The segment of the security data may be identified based on one or more security timestamps stored with the security data.

At 412, the one or more processors determine whether a segment of the security data was found that corresponded to/matches the WLA timestamp. When no security data is found that has a security timestamp that corresponds to the WLA timestamp, flow moves to 408, where the process returns a response indicating that no match was found. Alternatively, when a segment of the security data is found to match the WLA timestamp, flow continues to 414.

At 414, the process returns the segment of security data that corresponded to the WLA timestamp. The segment of security data may be presented in various manners, such as displayed on a graphical user interface of a mobile device, workstation or other electronic device.

Optionally, the process of FIG. 4A may perform an optional branch in accordance with certain embodiments herein. For example, in certain embodiments, it may be desirable to expand a search beyond the data and information collected by the WLA tracking apparatus and security apparatus. For example, it may be desirable to open the search to a broader Internet request. In accordance there with, the process of FIG. 4A may move from 408 and/or 414, as noted by dashed lines 416, to generate an Internet-based request at 420. At 420, the one or more processors construct an Internet-based search request related to the data and information captured by the WLA tracking apparatus and security system.

The Internet-based search request may be directed to network resources, such as a request for information concerning a particular wireless signature, individual, mobile device and the like. Additionally or alternatively, the Internet-based search request may be directed to the general public. For example, the Internet-based search request may include an image of an individual with a caption requesting further information (e.g., "Has anybody seen this person"). As another example, the Internet-based search request may be based on the wireless activity (e.g., "Does anyone know the owner of this phone number").

Figure 4B:
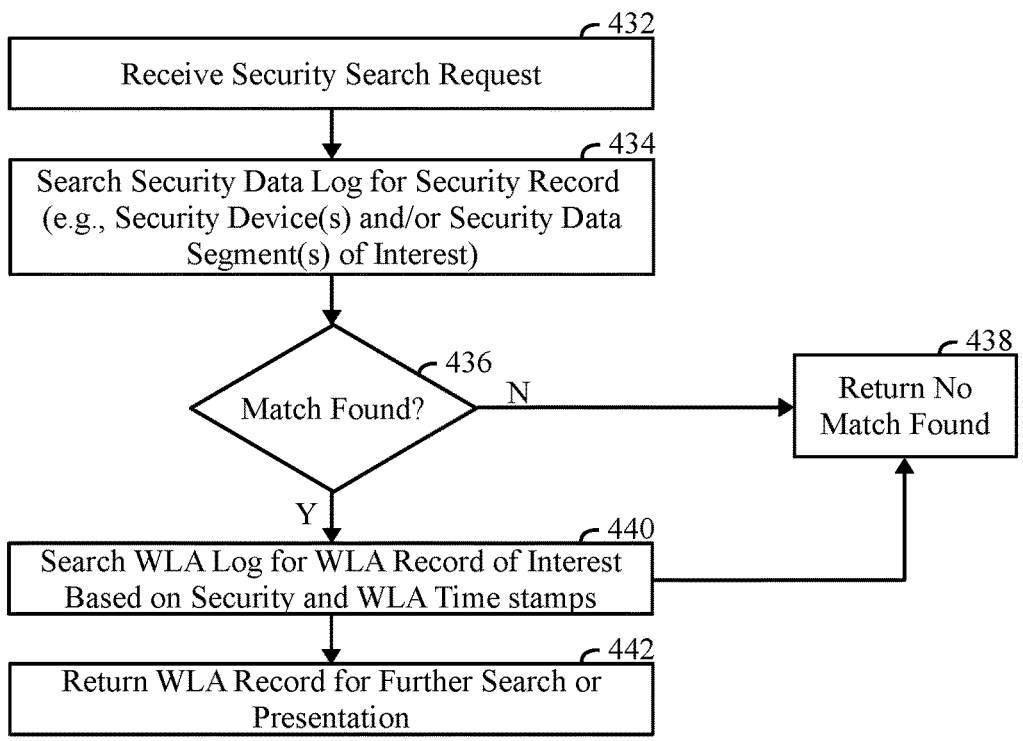
FIG. 4B illustrates a process for utilizing security data to identify wireless activity and/or WLA timestamps of interest in accordance with embodiments herein.

FIG. 4B illustrates a process for utilizing security data to identify wireless activity and/or WLA timestamps of interest in accordance with an embodiment herein. The operations of FIG. 4B may be implemented by the WLA tracking apparatus 104, the security apparatus 107, and/or the WLA search resource 110. At 432, the one or more processors receive a security search request. The security search request may include various search criteria. For example, the search criteria may designate security factors, such as a search for any unauthorized entries within a predetermined time frame, any unauthorized activity detected by cameras within certain security zones and the like. At 434, the one or more processors search the security data log for a security record of interest (e.g., a security device of interest and/or a security data segment of interest) that satisfies the security search criteria. At 436, the one or more processors determine whether a security record of interest was found that satisfies the security search criteria. When no match is found, flow continues to 438. At 438, a response is returned indicating that no match was found.

Alternatively, at 436, when a security record of interest is found, flow moves to 440. At 440, the one or more processors identify the security timestamp from the security record of interest. At 440, the processors search the WLA log for WLA records of interest. The search for the WLA record of interest may be based on the security timestamp and one or more WLA timestamps stored with the WLA records. For example, when a security timestamp indicates a particular point in time, the processors may identify, from the WLA log, any and all wireless signature that are present within the detection range of the WLA tracking apparatus at the particular point in time. The processors may identify, as matches, all wireless signature that were present within the detection range at the time of the security timestamp. Additionally or alternatively, the processors may identify, as matches, only unknown, repeating or restricted wireless signature that were present within the detection range at the time of the security timestamp. Additionally or alternatively, the determination at 440 may be limited to wireless signature that were determined to be present within particular security zones. For example, the security record of interest identified at 434 may correspond to a particular security zone. When a security record of interest corresponds to a particular security zone, the search at 440 may similarly limit the search of WLA records to the WLA records for the corresponding security zone.

At 440, the one or more processors also determine whether a WLA record was found that corresponded to/matches the security timestamp. When no matching WLA record is found that has a WLA timestamp that corresponds to the security timestamp, flow moves to 438, where the process returns a response indicating that no match was found. Alternatively, when a WLA record is found to match the security timestamp, flow continues to 442.

At 442, the process returns the WLA record (e.g., wireless signature, WLA timestamp, security zone, entry time, exit time) that corresponded to the security timestamp. The WLA record may then be automatically utilized to conduct further searches and/or may be presented in various manners, such as displayed on a graphical user interface of a mobile device, workstation or other electronic device.

In accordance with the operations of FIG. 4A, embodiments herein enable searches to be performed based on various types of search request. For example, the most basic type of search request would first request the WLA tracking apparatus to identify when wireless activity was present and based thereon, match security data segments for corresponding security cameras. As another example, a search request may know generally where an unauthorized event occurred, but not know when the event occurred. The "where" is determined by the WLA tracking apparatus, namely within the coverage area of the WLA tracking apparatus. In connection there with, a search request may request segments of security data that were collected by any security apparatus having security devices covering portions of the reception area associated with the WLA tracking apparatus (e.g., any security devices surrounding a commercial or residential location housing the WLA tracking apparatus).

As another type of search request, a searcher or system may know when an unauthorized event occurred, but not know where the event occurred. The search request may request the "when" based on security data from non-video security devices (e.g., "When did the motion detector or glass break detector sense an unauthorized event?"). For example, a motion detector or glass break detector may provide non-video security data indicating that an unauthorized entry occurred at a particular time frame. However, the non-video security data may not indicate where the unauthorized entry occurred. In a large commercial or residential area, numerous conventional video surveillance cameras would be reviewed. However, in accordance with embodiments herein, the WLA tracking apparatus may provide localized location information for an unknown or unauthorized wireless signature, such as a security zone where the unknown or unauthorized wireless signature was detected. Based on the security zone information collected by the WLA tracking apparatus, only security data segments need be reviewed for the security cameras having fields of view covering the identified security zone.

The process of FIG. 4A may be implemented in connection with various applications. For example, when a home security apparatus is coupled to a WLA tracking apparatus, an individual may enter a request for any videos security data corresponding to cameras covering security zones in which wireless signature were detected recently or over a predetermined period of time. The process may return one or more segments of security data (e.g., video clips, still images, audio clips and the like) for one or more cameras related to the region in which the wireless activity was detected. The process of FIG. 4A allows individuals to search for particular wireless signatures/fingerprints in order to determine time frames that individuals may show up in a particular video feed, photo and the like.

As another example, the search request may designate a particular wireless signature and/or individual (e.g., by name) and request segments of security data for time frames in which the designated wireless signature or individual were detected to be present by the WLA tracking device. For example, a homeowner or business or manager may wish to know when certain individuals (e.g., family members and employees) arrive and leave a local environment. Accordingly, embodiments herein allow search queries for specific segments of security data and/or a list of the security devices (e.g., cameras) that may include video and other security data related to specific wireless signatures/fingerprints.

In accordance with embodiments herein, the security data and wireless activity may be stored in a common log or in separate logs linked to one another. When the security data and wireless activity are stored in a relational manner, the search request may request segments of security data (e.g., video segments, sensor states) corresponding to time frames in which wireless activity was present within the local environment and the timestamp comparison at 410 omitted. For example, in the process of FIG. 4A, a user may request all video segments beginning at least one minute before entry of a wireless signature to a local wireless environment 100 and continuing for some predetermined period of time following entry of the wireless signature to a local environment. Similarly, users may request video segments beginning a predetermined period of time before exit of a wireless signature from a local environment and continuing for one minute after exit of the wireless signature.

The process of FIG. 4A may also be implemented in connection with WLA tracking apparatus and security apparatus that are independent systems and operate without coordination there between. For example, a residential or commercial property may have a WLA tracking device, but does not have a security system with video cameras. When a break-in occurs, the WLA tracking apparatus will record the wireless signature of the burglar, even though no video security data is obtained within the residential or commercial property in connection with the break-in. As another option, the residential or commercial property may have both a WLA tracking device and a security system with security cameras. However, the burglar may avoid exposure to the security cameras within the property. Notwithstanding, security cameras for neighboring security systems may still capture video security data showing the burglar.

Figure 5:
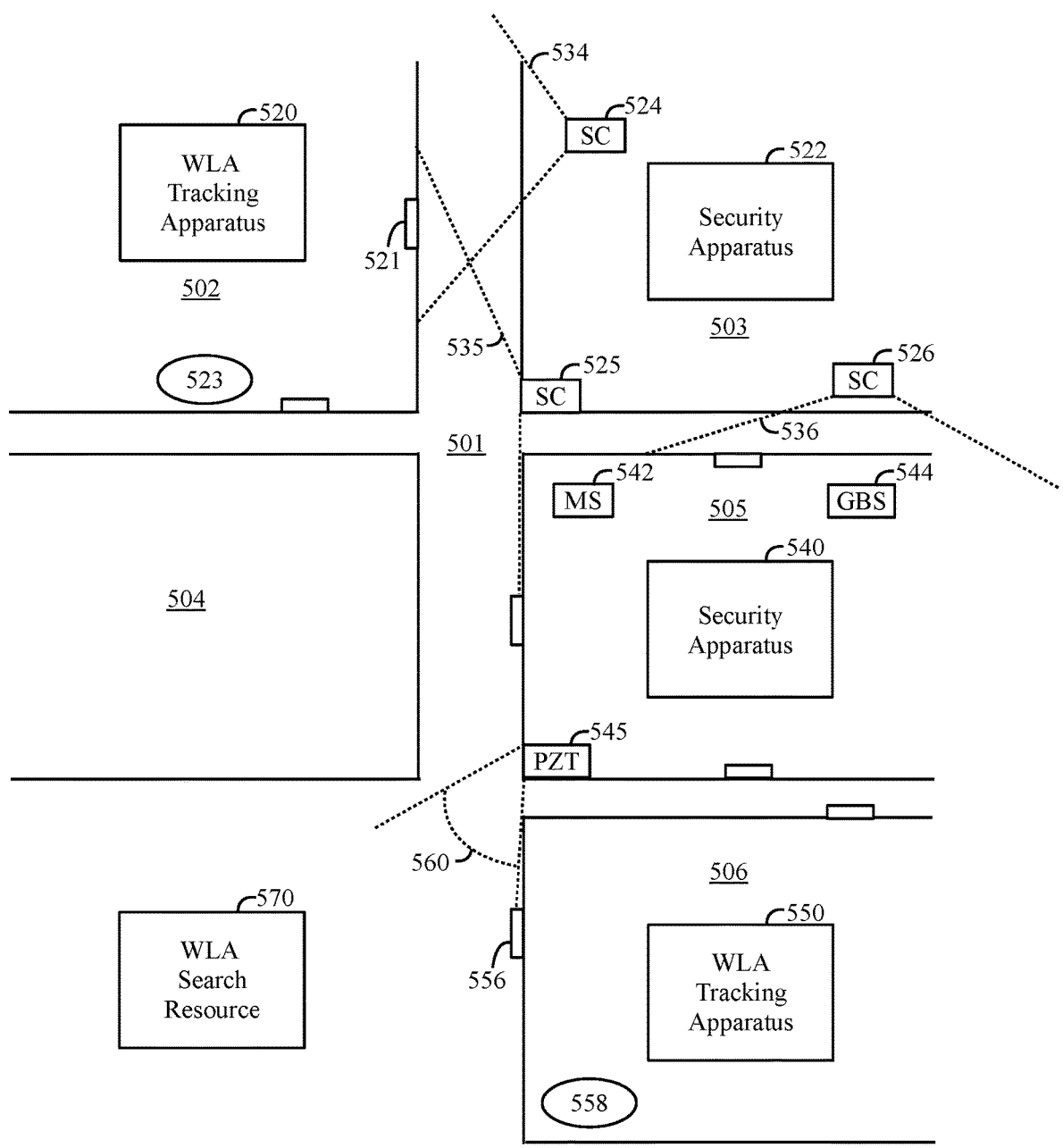
FIG. 5 is a functional block diagram illustrating a local wireless environment that includes independent WLA tracking apparatus and security apparatus in accordance with embodiments herein.

FIG. 5 is a functional block diagram illustrating a local wireless environment (e.g., a commercial or residential neighborhood) that includes independent WLA tracking apparatus and security apparatus in accordance with embodiments herein. In the embodiment of FIG. 5, the local wireless environment surrounds an intersection 501 within an urban area having separate residential or commercial premise 502-506 arranged on opposed sides of streets at the intersection 501. The premise 502 includes a WLA tracking apparatus 520 but does not include a security apparatus. The premise 503 includes a security apparatus 522 couple to security cameras 524-526 having corresponding fields of view as designated by dashed lines 534-536. The premise 504 does not include a WLA tracking apparatus, nor a security apparatus, while the premise 505 includes a security apparatus 540 coupled to a motion sensor 542, a glass break sensor 544 and a security camera 545 having pan zoom and tilt functionality. The premise 506 includes a WLA tracking apparatus 550. The WLA tracking apparatus and security apparatus of FIG. 5 operate independent of one another to separately store WLA records and security data in corresponding separate memories.

In accordance with embodiments herein, a WLA search resource 570 is configured to implement the search operations of FIG. 4A. The WLA search resource 570 operated independently of, communicated over a local or wide area network with, but the WLA tracking apparatus and security apparatus illustrated in FIG. 5. For example, the WLA search resource 570 may be managed by an independent third-party or local law enforcement agency. The owners/operators of the premise 502-506 may subscribe to a search service provided by the third-party, thereby affording a certain level of security and confidentiality in connection with data and other information conveyed over the network As one implementation example, an unauthorized individual may enter the premise 502 through a door 521, where the unauthorized individual carries a mobile device 523. The unauthorized individual may then perform an unauthorized action, such as stealing, vandalizing and the like, and then leave through the door 521. Given that the premise 502 does not include security cameras, the owner/operator of the premise 502 would have no video security data to review in attempting to identify the unauthorized individual. However, the premise 502 includes a WLA tracking apparatus 520 which recorded the wireless activity associated with the mobile device 523, such as the wireless signature and WLA entry and exit timestamps for when the mobile device 523 entered and left the premise 502.

The owner/operator of the premise 502 may submit a search request to the WLA search resource 570 (e.g., from a mobile device or from the WLA tracking apparatus 520). The search request may indicate the timeframe in which the mobile device 523 was present in the premise 502. In response thereto, the WLA search resource 520 may search security data stored at the WLA search resource 520 from any security device managed by the WLA search resource 570. Additionally or alternatively, the WLA search resource 520 may send requests to the security apparatus 522 and 540, requesting segments of security data corresponding to the WLA timestamps (e.g., exit and entry timestamps) from the search request. The security apparatus 522 may provide video segments of security data, stored in a video log, from one or more of the security cameras 524-526 for the requested timeframe, while the security apparatus 540 may return segments of security data, stored in a video log, from the motion sensor 542 and 544, and video data from the security camera 545. The video segments from the security cameras 524 and 525 potentially would include video showing the unauthorized individual entering and/or leaving through the door 521.

As another implementation example, a homeowner (or business owner) may own the premise 506. When the homeowner leaves the premise 506, the WLA tracking apparatus 550 may be armed to perform certain actions. For example, when the homeowner is away and the WLA tracking apparatus 550 detects wireless activity within the premise 506 (e.g., associated with a mobile device 558), the WLA tracking apparatus 550 may convey a search request to the WLA search resource 570. The search request may request that the security apparatus 540 within the adjacent premise 505 reorient the security camera 545 to a field of view 560 that includes the door 556 of the premise 506. The WLA search resource 570 may convey to the security apparatus 540 the request to reorient the security camera 545 in the requested manner. The security apparatus 540 may comply by redirecting the security camera 545. When the individual with the mobile device 558 leaves through the door 556, the security camera 545 would potentially capture video security data showing the individual.

Additionally or alternatively, when the WLA tracking apparatus 550 detects the presence of an unauthorized mobile device 558, the search request may also request that the security cameras 524-526 activate and capture video data for as long as the mobile device 558 is present, and for a predetermined period of time thereafter. For example, an offset time may be calculated, such that when an individual leaves the door 556 and walks in the direction of the intersection 501, the individual may arrive at the intersection 501 a predetermined period of time later (an offset time). Accordingly, the security data from the cameras 524-526 would be collected for at least the predetermined period of time, corresponding to the offset time, in order to potentially capture video including the individual with mobile device 558 after leaving the premise 506.

Figure 6:
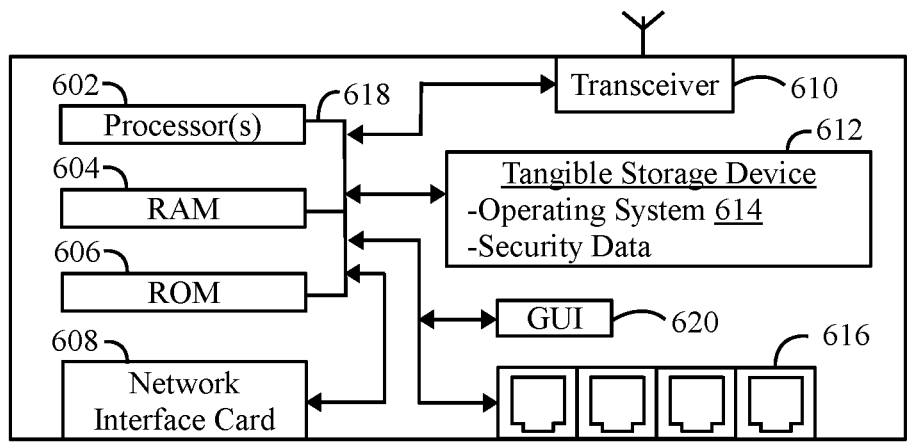
FIG. 6 is a block diagram of components of a WLA tracking apparatus formed in accordance with embodiments herein.

FIG. 6 is a block diagram of components of a WLA tracking apparatus formed in accordance with embodiments herein. The WLA tracking apparatus can include a GUI 620 one or more processors 602, one or more computer-readable RAMs 604, one or more computer-readable ROMs 606, one or more tangible storage devices 612, a network interface card 608, a transceiver 610, and optionally one or more network ports 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within a system.

One or more operating systems 614, sensitivity data, WLA logs, and WLA tracking programs are stored on computer-readable tangible storage device 612 for execution or access by one or more processors 602 via one or more RAMs 604 (which typically include cache memory). In the illustrated embodiment, computer-readable tangible storage device 612 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The WLA tracking apparatus may include a network interface card 608, such as a TCP/IP adapter card. The programs on network WLA tracking apparatus can be downloaded to the wireless router from an external computer or external storage device via a network (for example, the Internet, a local area network or other, wide area network or wireless network) and network interface card 608. The programs can then be loaded into computer-readable tangible storage device 612. The network may comprise copper wires, optical fibers, wireless transmission, routers, firewalls, switches, gateway computers and/or edge servers.

Figure 7:
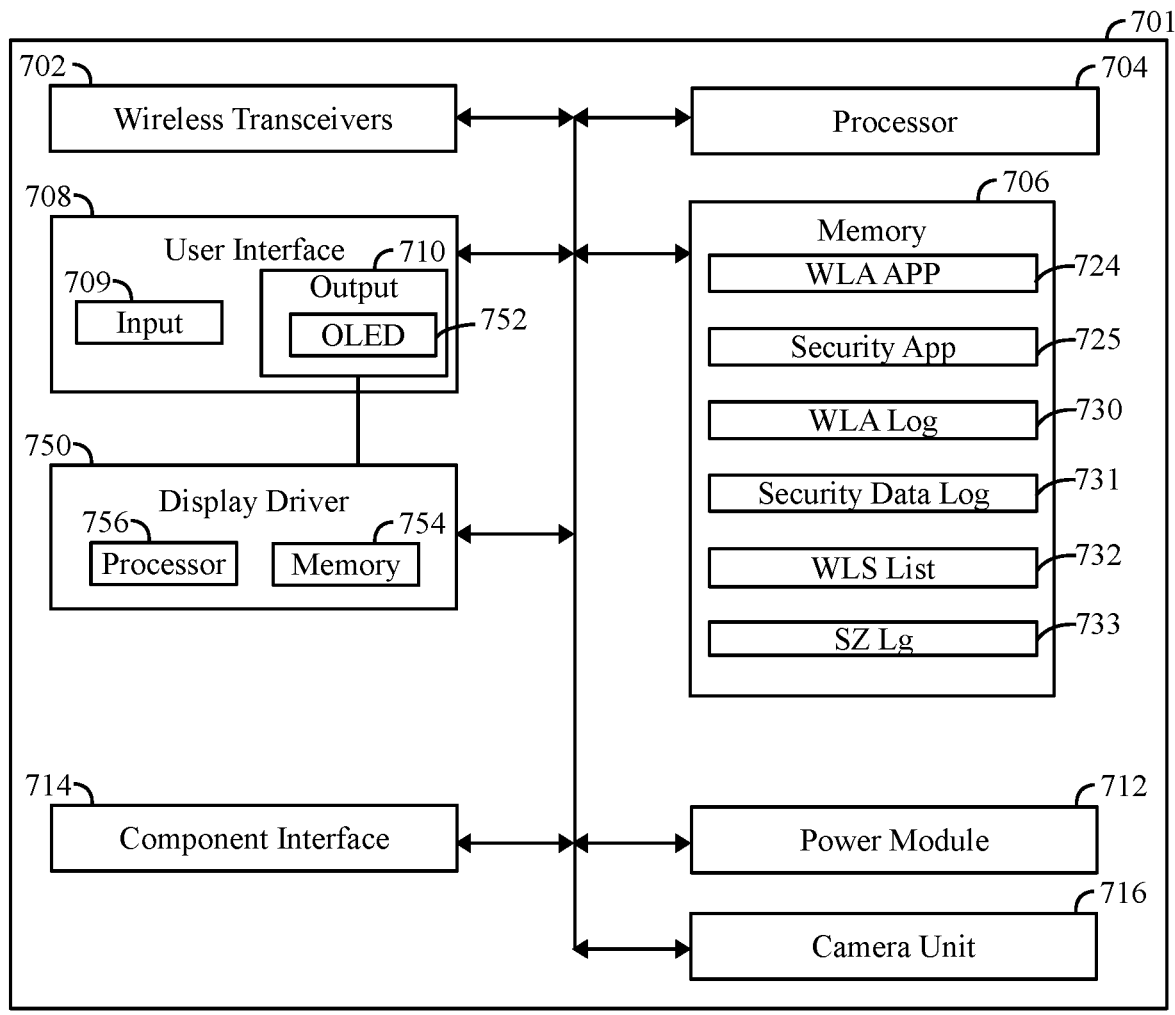
FIG. 7 illustrates a simplified block diagram of internal components of an electronic device configured to operate in accordance with embodiments herein.

FIG. 7 illustrates a simplified block diagram of internal components of an electronic device 701 configured to operate in accordance with embodiments herein. The device 701 may be configured to operate as a WLA tracking apparatus, security apparatus, WLA search resource, and/or mobile device. The device 701 includes components such as one or more wireless transceivers 702, one or more processors 704 (e.g., a microprocessor, microcomputer, application-specific integrated circuit, etc.), one or more local storage medium (also referred to as a memory) 706, a user interface 708 which includes one or more input devices 709 and one or more output devices 710, a power module 712, a component interface 714 and a camera unit 716. All of these components can be operatively coupled to one another, and can be in communication with one another, by way of one or more internal communication links, such as an internal bus. The camera unit 716 may capture one or more frames of image data.

The input and output devices 709, 710 may each include a variety of visual, audio, and/or mechanical devices. For example, the input devices 709 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 710 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 710 may include a touch sensitive screen, a non-touch sensitive screen, a text-only display, a smart phone display, an audio output (e.g., a speaker or headphone jack), and/or any combination thereof. Optionally, the input devices 709 may include one or more touch sensitive layers provided on the front and/or rear sides of the display 752. The output devices 710 include a flexible display layer, such as an OLED display 752.

The local storage medium 706 can encompass one or more memory devices of any of a variety of forms (e.g., read only memory, random access memory, static random access memory, dynamic random access memory, etc.) and can be used by the processor 704 to store and retrieve data. The data that is stored by the memory 706 can include, but need not be limited to, operating systems, applications, user collected content and informational data. Each operating system includes executable code that controls basic functions of the device, such as interaction among the various components, communication with external devices via the wireless transceivers 702 and/or the component interface 714, and storage and retrieval of applications and data to and from the memory 706. Each application includes executable code that utilizes an operating system to provide more specific functionality for the communication devices, such as file system service and handling of protected and unprotected data stored in the local storage medium 706.

When the device 701 represents a WLA tracking apparatus, a WLA tracking application 724 is stored in memory 706. The WLA tracking application 724 includes program instructions accessible by the one or more processors 704 to direct a processor 704 to implement the methods, processes and operations described herein including, but not limited to the methods, processes and operations illustrated in the Figures and described in connection with the Figures. The WLA tracking application 724 manages operation of the processor 704, display driver 750.

When the device 701 represents a security apparatus, a security application 725 is stored in the memory 706. The security application 725 includes program instructions accessible by the one or more processors 704 to direct a processor 704 to implement the methods, processes and operations described herein including, but not limited to the methods, processes and operations illustrated in the Figures and described in connection with the Figures. The security application 725 manages operation of the processor 704, display driver 750.

The memory 706 may also store one or more of a WLA log at 730, security data log 731, WLS list 732 and security zone log 733, all of which are utilized as described herein. Other applications stored in the memory 706 include various application program interfaces (APIs), some of which provide links to/from the cloud hosting service. The power module 712 preferably includes a power supply, such as a battery, for providing power to the other components while enabling the device 701 to be portable, as well as circuitry providing for the battery to be recharged. The component interface 714 provides a direct connection to other devices, auxiliary components, or accessories for additional or enhanced functionality, and in particular, can include a USB port for linking to a user device with a USB cable.

A display driver 750 is coupled to the processor 704 and configured to manage display of content on a display 752. The display driver 750 is connect to viewing regions of the OLED display 752. The display driver 750 writes the desired content to the viewing region under direction of the main processor 704. Optionally, the display driver 750 includes display memory 754 and one or more display control processors 756. Optionally, the display driver 750 may omit a separate processor and memory, and alternatively or additionally, utilize sections of the memory 706 as display memory and the processor 704 to manage writing content to a display memory section within the memory 706.

Before concluding, it is to be understood that although e.g., a software application for undertaking embodiments herein may be vended with the apparatus and devices described herein, embodiments herein apply in instances where such an application is e.g., downloaded from a server to a device or apparatus over a network such as the Internet. Furthermore, embodiments herein apply in instances where e.g., such an application is included on a computer readable storage medium that is being vended and/or provided, where the computer readable storage medium is not a carrier wave or a signal per se.

CLOSING STATEMENTS

Before concluding, it is to be understood that although e.g., a software application for undertaking embodiments herein may be vended with a device such as the system, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "utilizing one or more of the wireless activity and timestamp" means and shall encompass i) "utilizing the wireless activity", ii) "utilizing the timestamp" and/or iii) "utilizing both the wireless activity and the timestamp". For the avoidance of doubt, the claim limitation "to identify one or more of the security device and a segment of the security data" means and shall encompass i) "to identify the security device", ii) "to identify a segment of the security data" and/or iii) "to identify the security device and a segment of the security data".

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
under control of one or more processors configured with executable instructions;
detecting, at a wireless activity (WLA) tracking apparatus, wireless activity of a mobile device in a proximity of a local wireless environment;
automatically generating a WLA timestamp associated with the detecting the wireless activity of the mobile device; and
utilizing the wireless activity and the WLA timestamp to identify a security device and a segment of security data collected by the security device; wherein the detecting comprises detecting a wireless signature of the mobile device, and wherein the utilizing comprises automatically correlating the wireless signature with the security device and the segment of security data collected by the security device based on the WLA timestamp; and
wherein the utilizing further comprises receiving a search request designating a wireless activity factor, and searching a WLA log for a WLA record of interest that satisfies the wireless activity factor, the WLA record of interest including the wireless signature and the WLA timestamp.

2. The method of claim 1, further comprising displaying the segment of security data collected by the security device that overlaps the WLA timestamp.

3. The method of claim 1, wherein further comprising identifying a security zone in the local wireless environment in which the wireless activity occurred, wherein the utilizing further comprises identifying the security device that corresponds to the security zone.

4. The method of claim 1, further comprising performing a security action based on the security device and the segment of security data identified.

5. The method of claim 4, wherein the security action comprises sending an electronic notification to security personnel.

6. The method of claim 4, wherein the security action comprises sending a request to change a state of the security device.

7. The method of claim 1, wherein the security device represents a PZT camera having pan, zoom and tilt (PZT) functionality, wherein the security action comprises redirecting the PZT camera to point towards a detected path of the mobile device.

8. The method of claim 1, wherein the wireless activity represents one or more signals transmitted by the mobile device in connection with one or more of requesting, establishing, maintaining or disconnecting a communications session with the local wireless environment.

9. The method of claim 1, wherein the mobile device utilizes a wireless transmitter to establish at least a one-way or two-way communication session with the WLA tracking apparatus.

10. A method, comprising:
under control of one or more processors configured with executable instructions;
detecting, at a wireless activity (WLA) tracking apparatus, wireless activity of a mobile device in a proximity of a local wireless environment;
automatically generating a WLA timestamp associated with the detecting the wireless activity of the mobile device; and
utilizing the wireless activity and the WLA timestamp to identify a security device and a segment of security data collected by the security device; wherein the detecting comprises detecting a wireless signature of the mobile device, and wherein the utilizing comprises automatically correlating the wireless signature with the security device and the segment of security data collected by the security device based on the WLA timestamp; and
wherein the utilizing further comprises searching a security data log for security data of interest based on a comparison of the WLA timestamp and security timestamps stored in the security data log, the security data of interest including the security device and the segment of security data collected by the security device.

11. The method of claim 10, further comprising displaying the segment of security data collected by the security device that overlaps the WLA timestamp.

12. An apparatus, comprising:
a tracking circuit to detect wireless activity in proximity to a local wireless environment;
wherein to detect the wireless activity comprises to detect a wireless signature of a mobile device;
a processor; and
a memory to store program instructions accessible by the processor, wherein, responsive to execution of the program instructions, the processor to perform the following:
automatically generate a WLA timestamp associated with the detecting of the wireless activity of the mobile device; and
utilize the wireless activity and the WLA timestamp to identify a security device and a segment of security data collected by the security device; and
wherein to utilize the wireless activity and the WLA timestamp to identify the security device and the segment of the security data collected by the security device comprises:
automatically correlating the wireless signature with the security device and the segment of security data collected by the security device based on the WLA timestamp;
receiving a search request designating a wireless activity factor; and
searching a WLA log for a WLA record of interest that satisfies the wireless activity factor, the WLA record of interest including the wireless signature and the WLA timestamp.

13. The apparatus of claim 12, where the memory stores the WLA log including the WLA record of interest, the WLA record of interest including the corresponding WLA timestamp indicating when the wireless signature of the mobile device was detected.

14. The apparatus of claim 13, wherein the WLA record of interest further comprises one or more of security zones where the wireless signature is detected, a WLS entry time in connection with the wireless signature entering a detection range of the tracking circuit, and a WLS exit time in connection with the wireless signature exiting the detection range.

15. The apparatus of claim 13, wherein the memory stores a WLS list that includes one or more of known wireless signatures, repeat wireless signatures and restricted wireless signatures.

16. The apparatus of claim 12, wherein the processor, responsive to execution of program instructions, to maintain the WLA log of wireless signatures of mobile devices detected by the tracking circuit and corresponding WLA timestamps.

17. The apparatus of claim 12, wherein the processor, responsive to execution of program instructions, to search a security data log for security data of interest based on a comparison of the WLA timestamp and security timestamps stored in the security data log, the security data of interest including the security device and the segment of security data collected by the security device.

18. A computer program product comprising a non-transitory computer readable storage medium comprising computer executable code to:
    detecting, at a wireless activity (WLA) tracking apparatus, wireless activity of a mobile device within a proximity of a local wireless environment;
    automatically generating a WLA timestamp associated with the detecting of the wireless activity of the mobile device; and
    utilizing the wireless activity and the WLA timestamp to identify a security device and a segment of security data collected by the security device; wherein the detecting comprises detecting a wireless signature of the mobile device, and wherein the utilizing comprises automatically correlating the wireless signature with the security device and the segment of security data collected by a security device based on the WLA timestamp; and
    wherein the utilizing further comprises receiving a search request designating a wireless activity factor, and searching a WLA log for a WLA record of interest that satisfies the wireless activity factor, the WLA record of interest including the wireless signature and the WLA timestamp.

19. The computer program product of claim 18, further comprising a security data log, wherein the computer executable code to search the security data log for the security data based on a comparison of the WLA timestamp and security timestamps stored in the security data log, the security data including the security device and the segment of security data collected by the security device.

20. The computer program product of claim 18, further comprising a WLA log including WLA records that include wireless signatures of mobile devices detected, the WLA records including corresponding WLA timestamps indicating when the wireless signatures of the mobile devices were detected.

\* \* \* \* \*